Figure 1:
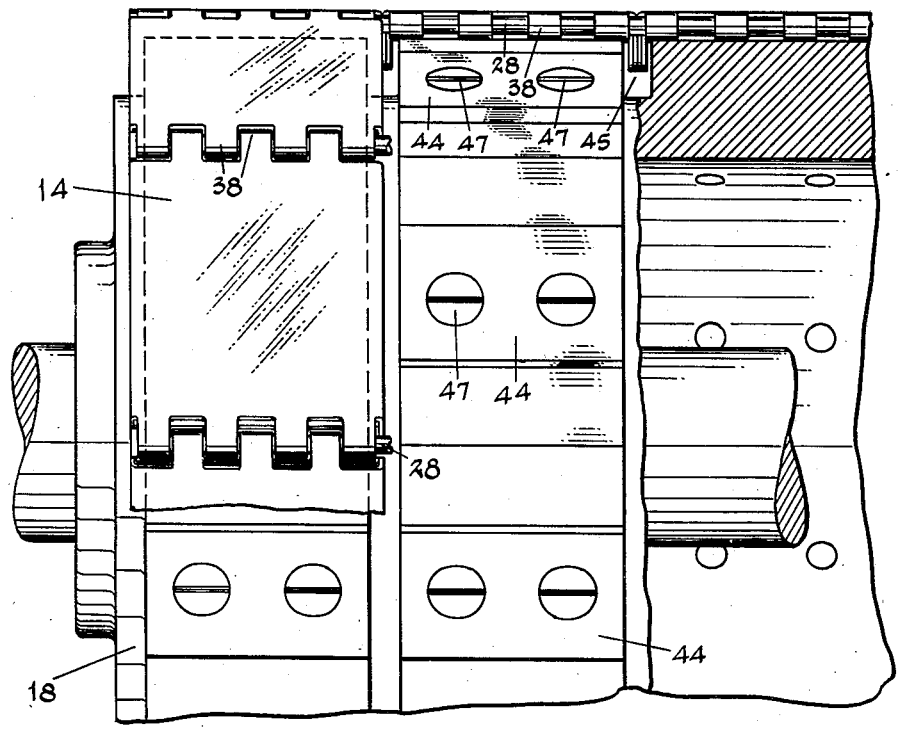

May 27, 1941.     G. W. BATCHELL     2,243,145
PANELED LEHR BELT
Filed Feb. 16, 1940     2 Sheets-Sheet 1

Inventor
George W. Batchell
By Faust F. Crampton
Attorney

May 27, 1941.   G. W. BATCHELL   2,243,145
PANELED LEHR BELT
Filed Feb. 16, 1940   2 Sheets-Sheet 2

Inventor-
George W. Batchell
By Faust F. Crampton
Attorney

Patented May 27, 1941

2,243,145

UNITED STATES PATENT OFFICE 2,243,145

PANELED LEHR BELT

George W. Batchell, Toledo, Ohio

Application February 16, 1940, Serial No. 319,326

2 Claims. (Cl. 198—189)

My invention has for its object to provide a paneled lehr belt, wherein a substantially plane surface is provided for supporting the material as it is passed through the lehr for heat treatment. The invention is of particular value in glass-treating lehrs, in that it affords a plane, flat, or smooth surface for the glassware, and avoids the formation of permanent indentations in the glass, as the glass becomes heated and then cooled as it passes through the zonal temperatures of the lehr.

The invention, particularly, provides an efficient paneled belt, wherein there is provided a positive interengagement between each of the panels and the driving and following cylinders, which prevent slipping or periodical disengagement between the belt and the cylinders, and where, notwithstanding the high temperature of the lehr, deformation of the engaged parts of the belt is prevented, which insures a permanence of the belt when, thus, used in highly heated lehrs.

The paneled belt has several advantages over the commonly used wire belt for conveyors of articles in lehrs. An important advantage is that an almost uniform, flat, ware-carrying surface is provided. In the use of wire belts, considerable damage to the semi-plastic ware, produced in the heat zone, has been encountered, which causes, by reason of its weight, indentations to be formed in the bottom surfaces of the ware, which detract from the market value of the ware. In the wire belt, a heavy additional tension must be placed upon it, in order that the traction or friction, between the belt and the driving cylinder, may be sufficient to pull the load. This causes the wire cloth to unduly stretch, which does not occur in the paneled belt. Also, where a wire belt is used, the belt does not, ordinarily, track evenly upon the various rollers, and requires fine adjustment in the alignment of the rollers, so that the belt will not work to one, or the other, side of the lehr. Flanges are provided on the panels, which run in channels in the driving and following cylinders, making track adjustments unnecessary. Also, in wire belts, as they move along the rollers, the points of contact, at the bends of the wires, work frictionally against each other and there is a tendency of a continuous bending at the points of sharp curvature of the wires, which causes early fracture of the belt; while in the panel belt, the side surfaces of the hinges of the panels contact with the engaging projections of the cylinders and provide superior bearing qualities and a longer life. The paneled belt is formed of small units, so that various belt widths may be used, making it unnecessary to carry in stock various belt, having unchangeable widths, as is the case in wire belts.

The invention, particularly, provides a paneled belt, having parts formed to interfit with engaging blocks or lugs on the driving and following cylinders, or idlers, to prevent slippage and insure the proper belt tension, which prevents looping between the supporting rollers.

The invention may be contained in heat-treating lehrs and furnaces of different forms and may be used for different purposes. The invention is of particular advantage when used in the heat-treatment of glassware, and to illustrate a practical application of the invention, I have selected a paneled lehr belt as an example of the various structures embodying the invention, which is shown in the accompanying drawings.

Figure 2:
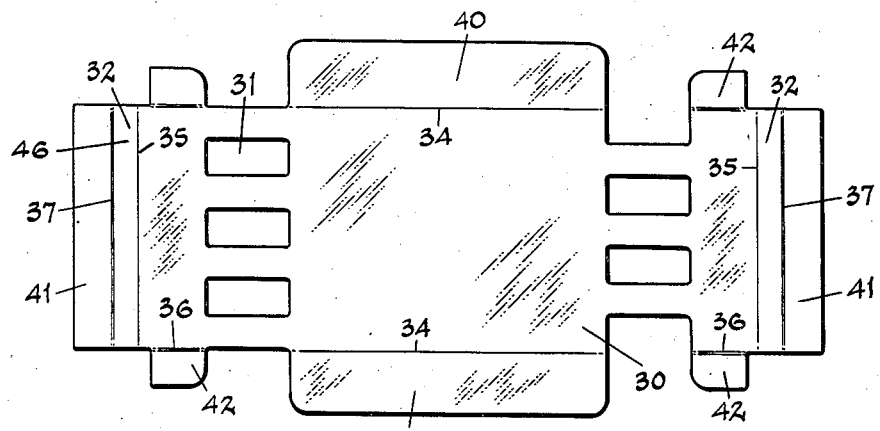
Figure 3:
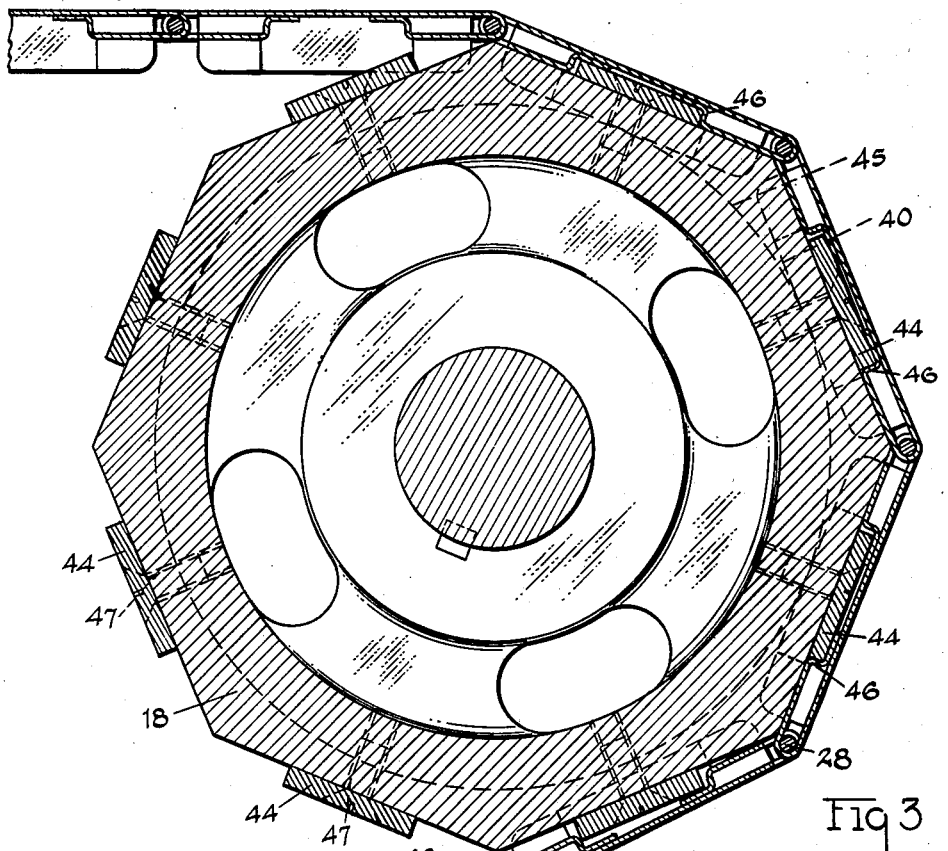
Figure 4:
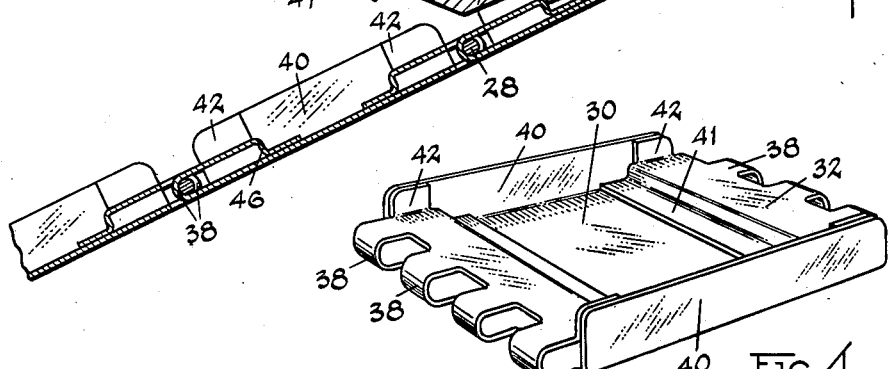

Fig. 1 illustrates an enlarged, side view of one of the cylinders and two or more of the panels of the belt. Fig. 2 illustrates a metal blank, from which the sections, or units, of the belt are formed. Fig. 3 illustrates a transverse section of the driving cylinder. Fig. 4 illustrates a perspective view of the underside of one of the panels.

The belt 14 is formed of a plurality of units, which are interconnected, by means of rods 28 that extend the full width of the belt. Each unit may be formed from a blank struck from sheet metal, such as is shown in Fig. 2, and have a central plate part 30 and end parts 32 provided with slots 31. The sheet metal blank is bent along the lines 34, 35, 36, and 37, at right angles to contiguous portions, to form the unit shown in Fig. 4. The slotted portion of the end parts 32, when bent, form spaced hollow lugs 38, which form dovetailing parts, or hinged barrels, which interfit with the lugs of the adjacent panel and may be connected together, by means of the rod 28, which extends crosswise the lehr and through the hollow lugs 38. The sides of the units are formed to have the flanges 40, which extend downward, with respect to the supporting upper surface of the belt, and, also, the end parts 32 are provided with flanges 41. When the panels are shaped, the flanges 41 are located against the underside of the central part of the panel and welded thereto. The end parts 32 are bent to form the lugs 38. The lugs extend between the side flanges 40, and the ends of the end parts 32 are provided with ears 42, which are located against the inner surfaces of the side flanges 40, and the ears 42 are welded to the flanges 40.

Thus, the connecting end parts are structurally reenforced by the flanges 40 and 41 and the ears 42, which provides an exceedingly strong panel. The cylinders 18, 20, and 21 are polygonally formed, and spaced blocks 44 are located on each face of the cylinders to enter between the end parts 32 of the units and the side flanges 40. The driving edges of the blocks 44 engage shoulders 46, formed by the shaping of the end parts 32. The cylinders are also, provided with channels or grooves 45, between which the spaced blocks are mounted. The spaced blocks may be secured to the faces of the cylinders, by means of screws 47. The spaced blocks are disposed between and extend to the grooves 45 of the cylinders. The grooves 45 are adapted to receive the side flange 40 of each adjacent panel and operate to prevent movement of the belt in a lateral direction and maintain the belt in constant relation with respect to the cylinder. The spaced blocks 44 substantially fit between the shoulders 46 and operate to produce a positive drive of the belt, by means of the driving cylinder 18. The width of the faces of the cylinders are, substantially, the same as the distance between the rods 28, whereby, as the cylinders rotate, the belt hinges on each of the rods, and, consequently, no part of the belt is bent, but each section of the belt pivots on the rods, as they pass over the cylinders.

I claim:

1. In a paneled belt for lehrs, a plurality of panels, each having side flanges and looped end parts; the end parts having inwardly extending portions and end flanges welded to the underside of the panel; the end flanges having side ears welded to the side flanges; the inwardly extending portions forming sprocket-engaging shoulders for driving the belt; the looped end parts having slots forming dovetailing, hollow lugs; and rods extending through the lugs for connecting the panels.

2. In a paneled belt for lehrs, a plurality of panels, each having side flanges and looped end parts; the end parts having inwardly extending portions and end flanges welded to the underside of the panel; the end flanges having side ears welded to the side flanges; the inwardly extending portions forming sprocket-engaging shoulders for driving the belt; the looped end parts having slots forming dovetailing, hollow lugs; rods extending through the lugs for connecting the panels; a driving cylinder and an idler having octagonal faces and face lengths, substantially, the same as the distances between the rods; and blocks, substantially, fitting between the said portions and the side flanges and located on the faces.

GEORGE W. BATCHELL.